United States Patent [19]

Yamada et al.

[11] Patent Number: 5,096,954
[45] Date of Patent: Mar. 17, 1992

[54] AQUEOUS COATING COMPOSITION COMPRISING AN ACRYLIC RESIN AND A SPIROGUANAMINE RESIN

[75] Inventors: Takeshi Yamada; Yukihiro Ueda; Ryòsuke Ohtomo; Tetuhisa Nakamura, all of Tokyo, Japan

[73] Assignee: Toyo Ink Manufacturing Co., Ltd., Tokyo, Japan

[21] Appl. No.: 515,408

[22] Filed: Apr. 27, 1990

[30] Foreign Application Priority Data

Apr. 28, 1989 [JP] Japan ................. 1-111421

[51] Int. Cl.$^5$ ............................... C08L 19/02
[52] U.S. Cl. ........................ 524/385; 524/458; 524/460; 524/510; 524/511; 524/512
[58] Field of Search ............ 524/385, 458, 460, 510, 524/511, 512

[56] References Cited

U.S. PATENT DOCUMENTS

4,410,663 10/1983 Hohlein et al. ............ 524/512
4,933,214 6/1990 Sugiura et al. ............ 427/379

FOREIGN PATENT DOCUMENTS

1139179 5/1989 Japan.

*Primary Examiner*—Joseph L. Schofer
*Assistant Examiner*—Jeffrey T. Smith
*Attorney, Agent, or Firm*—Wenderoth, Lind & Ponack

[57] ABSTRACT

An aqueous coating composition capable of forming a film having excellent water resistance, high hardness, excellent processability and excellent shelf stability, and the coating composition comprises:

(a) 30 to 65 parts by weight of an aqueous acrylic resin, which is produced by copolymerizing monomers (i) to (v):

(i) 25 to 35% by weight of at least one aromatic vinyl monomer, (ii) 25 to 45% by weight of at least one alkyl (meth)acrylate, (iii) 1 to 15% by weight of at least one $\alpha,\beta$-monoethylenically unsaturated carboxylic acid, (iv) 5 to 25% by weight of at least one hydroxyalkyl (meth)acrylate, and (v) 1 to 25% by weight of at least one N-alkoxymethyl (meth)acrylamide, (b) 20 to 50 parts by weight of an aqueous amino resin, and (c) 5 to 25 parts by weight of a polyol, provided that the total amount of the above (a), (b) and (c) is 100 parts by weight.

15 Claims, No Drawings

AQUEOUS COATING COMPOSITION COMPRISING AN ACRYLIC RESIN AND A SPIROGUANAMINE RESIN

FIELD OF THE INVENTION

This invention relates to an aqueous coating composition, and in particular, it relates to an aqueous coating composition which has excellent withstandability to retorting treatment and excellent processability and which is reduced in solvent content.

PRIOR ART OF THE INVENTION

Outer surfaces of a beverage can containing a soft drink, a food can containing a food, and the like are coated with films which prevent corrosion of the can material, enhance the can's aesthetic commercial value and withstand heat treatment for sterilizing the drink and food. Such films have been conventionally formed by applying a coating composition, i.e. a solution of an epoxy/amino resin, acrylic/amino resin, polyester-/amino resin or the like in an organic solvent, by means of a roll coater and baking the resulting coating in a gas oven to cure it. However, these coating compositions cause air pollution by volatilization of a large amount of the solvent at the baking time. Further, these coating compositions are undesirable in view of saving resources. It has therefore been desired to develop a coating composition which can overcome such problems.

Known aqueous coating compositions are classified into two types such as coating compositions of water-dispersible resins and those of water-soluble resins. In general, most of the water-dispersible resins are synthesized by an emulsion polymerization method using a surfactant, and there is therefore a defect in that the surfactant used remains in a formed film and reduces its water resistance. On the other hand, water-dispersible or water-soluble resins are also produced, without using any surfactant, by synthesizing resins having an acid content (carboxyl group) in an organic solvent system, and neutralizing the synthesized resins with a volatile base. Since, however, these aqueous coating compositions are required to have an acid content, as an acid number, of not less than 20 in their fundamental resin structure, they have a defect in that they are inferior in water resistance and alkali resistance. In order to overcome these defects, there have been employed a method which uses a large amount of an aqueous amino resin such as hexamethoxymethylmelamine, methylated benzoguanamine, or the like. However, the resultant coating composition suffers a reduction in processability to a great extent. When the amount of the aqueous amino resin is reduced to improve the processability, the resultant film is liable to suffer a reduction in hardness. Thus, it has been difficult to achieve well-balanced water resistance, film hardness and processability characteristics.

Further, conventional aqueous coating compositions contain not less than 10% by weight of an organic solvent to improve shelf stability and leveling at a coating time, and they are therefore not satisfactory in view of air pollution caused by solvent volatilization at a baking time and saving of resources.

Furthermore, there are conventional aqueous coating compositions which do not fail in water resistance even if they are treated with boiling water. When they are treated with pressurized boiling water having a temperature of 120° C. or more, however, they cannot maintain aesthetic commercial value of cans since the films formed thereof are blistered, dissolved or whitened.

SUMMARY OF THE INVENTION

It is an object of this invention to provide an aqueous coating composition suitable for coating an outer surface of a can.

It is another object of this invention to provide an aqueous coating composition capable of forming a film having excellent water resistance which can withstand a heat-treatment step for sterilization of beverage cans and food cans, or retorting treatment in particular.

It is further another object of this invention to provide an aqueous coating composition capable of forming a film having high hardness to reduce occurrence of damage to cans during transportation and excellent processability to adapt itself to the manufacture of cans in various forms.

It is still further another object of this invention to provide an aqueous coating composition having a reduced organic solvent content and having excellent shelf stability and film-forming properties.

According to this invention, there is provided an aqueous coating composition which comprises:

(a) 30 to 65 parts by weight of an aqueous acrylic resin being soluble or dispersible in an aqueous medium in the presence of a base and having a weight average molecular weight of 3,000 to 12,000, which is produced by copolymerizing monomers (i) to (v):

(i) 25 to 35% by weight of at least one aromatic vinyl monomer, (ii) 25 to 45% by weight of at least one alkyl (meth)acrylate having an alkyl group containing 1 to 18 carbon atoms, (iii) 1 to 15% by weight of at least one $\alpha,\beta$-monoethylenically unsaturated carboxylic acid (iv) 5 to 25% by weight of at least one hydroxyalkyl (meth)acrylate having a primary hydroxyl group, and (v) 1 to 25% by weight of at least one N-alkoxymethyl (meth)acrylamide having an alkyl group containing 1 to 4 carbon atoms, (b) 20 to 50 parts by weight of an aqueous amino resin, and (c) 5 to 25 parts by weight of a polyol containing a terminal hydroxyl group and having a weight average molecular weight of up to 1,000, preferably from 100 to 1000, provided that the total amount of the above (a), (b) and (c) is 100 parts by weight.

DETAILED DESCRIPTION OF THE INVENTION

Examples of (a-iii) the $\alpha,\beta$-monoethylenically unsaturated carboxylic acid of this invention are acrylic acid, methacrylic acid, crotonic acid, maleic acid, fumaric acid, itaconic acid, etc., and acrylic acid and methacrylic acid are particularly preferred. The amount of the $\alpha,\beta$-monoethylenically unsaturated carboxylic acid used for the aqueous acrylic resin is 1 to 15% by weight. When this amount is less than 1% by weight, it is difficult to make the acrylic resin aqueous, and when it is more than 15% by weight, the resultant film has poor water resistance.

Examples of (a-iv) the hydroxyalkyl (meth)acrylate having a primary hydroxyl group are hydroxymethyl acrylate, hydroxyethyl acrylate, hydroxypropyl acrylate, hydroxyamyl acrylate, hydroxybutyl acrylate, methacrylates corresponding to these acrylates, etc. And, hydroxymethyl acrylate and hydroxyethyl acrylate or methacrylate are preferred. The amount of the hydroxyalkyl (meth)acrylate used for the aqueous acrylic resin is 5 to 25% by weight based on the aqueous acrylic resin. When this amount is less than 5% by weight, the resultant film has poor water resistance as a result of a low crosslinking degree, and the resultant coating composition has inferior stability due to insufficiency in hydrophilic groups. When this amount is more than 25% by weight, the resultant film has inferior flexibility due to a high crosslinking degree.

Examples of (a-v) the N-alkoxymethyl (meth)acrylamide having an alkyl group containing 1 to 4 carbon atoms are N-methoxymethylacrylamide, N-(n-butoxy)-methylacrylamide, N-(isopropyl)methylacrylamide, and methacrylamides corresponding to these acrylamides. N-methoxymethylacrylamide is particularly preferred. The amount of the N-alkoxymethyl (meth)acrylamide is 1 to 25% by weight based on the aqueous acrylic resin. When this amount is less than 1% by weight, the withstandability of the resultant film to treatment with pressurized boiling water (to be referred to as "retorting treatment") is reduced. And, when it is more than 25% by weight, the adhesion of the resultant film is reduced, and such a large amount is also undesirable in view of coloring and cost.

Examples of (a-i) the aromatic vinyl monomer are styrene, α-methylstyrene, etc. Examples of (a-ii) the alkyl (meth)acrylate having an alkyl group containing 1 to 18 carbon atoms are methyl (meth)acrylate, ethyl (meth)acrylate, 2-ethylhexyl (meth)acrylate, cyclohexyl (meth)acrylate, butyl (meth)acrylate, stearyl (meth)acrylate, lauryl (meth)acrylate, decyl (meth)acrylate, dodecyl (meth)acrylate, etc. Further, a vinyl carboxylate such as vinyl acetate, vinyl propionate or the like, or a vinyl alkyl ether such as vinyl ethyl ether, vinyl propyl ether, vinyl butyl ether or the like may be incorporated to form the aqueous acrylic resin. The total amount of the above aromatic vinyl monomer, the above alkyl (meth)acrylate and, optionally, the vinyl carboxylate or vinyl alkyl ether is 50 to 80% by weight based on the aqueous acrylic resin. The amount of the aromatic vinyl monomer is 25 to 35% by weight based the aqueous acrylic resin. A homopolymer of the aromatic vinyl monomer has a high glass transition point of not less than 80° C. Therefore, when the aromatic vinyl monomer is used in a coating composition to coat a can outer surface, it prevents a pigment from migrating onto a white-printed can surface when cans are brought into contact with one another at a retorting treatment time. For this reason, the amount of the aromatic vinyl monomer is required to be not less than 25% by weight based on the aqueous acrylic resin. However, the use of more than 35% by weight of the aromatic vinyl monomer, undesirably, reduces the solubility of the acrylic resin in water and increases its viscosity.

The aqueous acrylic resin of this invention can be produced by an ordinary solution polymerization method. That is, a mixture of the above monomers is radical-polymerized in an organic solvent in the presence of a catalyst of a peroxide such as benzoyl peroxide or an azo compound such as 2,2'-azobisisobutyronitrile.

When the aqueous acrylic resin is dissolved or dispersed in an aqueous medium, not only water but also a volatile base such as ammonia, organic amine or the like are added to a solution of the produced aqueous acrylic resin in the organic solvent. The volatile base has a boiling point of not more than 400° C., and is used in such an amount that can at least partially neutralize a carboxylic acid in the aqueous acrylic resin. Examples of the organic amine are monoethanol amine, dimethylamine, diethylamine, triethylamine, triethanolamine, diethylethanolamine, dimethylethanolamine, etc. Thereafter, the organic solvent in the solution is distilled off under reduced pressure at a temperature between 40° C. and 100° C., whereby a solution or dispersion of the acrylic resin in an aqueous medium is obtained. In view of the above poststep distillation, the organic solvent used in the above polymerization is preferably at least one solvent having a boiling point of not more than 150° C. When the temperature for the polymerization and solubility of the produced aqueous acrylic resin in the organic solvent are taken into account, preferred examples of the organic solvent having a boiling point of 40° to 150° C. are alcohol solvents such as methanol, ethanol, isopropyl alcohol, n-butanol, isobutyl alcohol, n-amyl alcohol, isoamyl alcohol, etc., and ether solvents such as ethylene glycol monomethyl ether, ethylene glycol monoethyl ether, ethylene glycol monoisopropyl ether, etc. In addition, a high-boiling solvent such as ethylene glycol monobutyl ether, ethylene glycol monohexyl ether or Carbitol-type solvent may be used in combination.

The aqueous medium in which the aqueous coating composition of this invention is dissolved or dispersed is a mixture of water with 2 to 25% by weight, preferably 5 to 15% by weight of the above organic solvent.

The amount of the aqueous acrylic resin of this invention is 30 to 65 parts by weight based on 100 parts by weight of the total resin solid content of the aqueous coating composition. When this amount is less than 30 parts by weight, the resultant aqueous coating composition has inferior adhesion to an undercoat material. When the amount is more than 65 parts by weight, the coating composition has inferior hardness and inferior water resistance.

The aqueous amino resin (b) of this invention is a resin that is soluble or dispersible in the aqueous medium, and selected from a partially alkyl-etherified melamine resin, a partially alkyl-etherified benzoguanamine resin and a spiroguanamine resin formed by converting spiroguanamine represented by the following formula

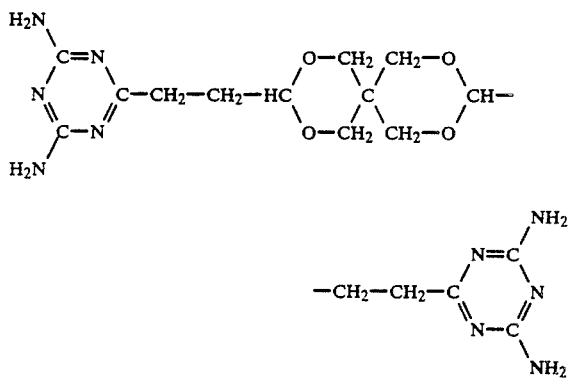

or a mixture of the above spiroguanamine with melamine or benzoguanamine to a methylol form, and partially alkyletherifying the methylol-formed guanamine with an alcohol containing 1 to 3 carbon atoms. In particular, the spiroguanamine resin is preferred for a reason that the amount of a tar-like or powder-like low-molecular weight substance generated at a baking time is small as compared with the use of melamine resin or benzoguanamine resin.

The amount of the aqueous amino resin is 20 to 50 parts by weight based on the total solid content of the coating composition. When this amount is less than 20 parts by weight, the resultant film has insufficient hardness, and when it exceeds 50 parts by weight, the film has inferior processability.

Examples of (c) the polyol having a terminal hydroxyl group and a weight average molecular weight of from 100 to 1,000 are selected from a wide range including a polyalkylene ether-terminated diol, polyester diol, polyester polyol, acrylic polyol, polybutadiene-terminated diol, polyurethane polyol, adduct of bisphenol A with ethylene oxide, adduct of bisphenol A with propylene oxide, adduct of bisphenol F with ethylene oxide, adduct of bisphenol F with propylene oxide, etc. The amount of the polyol is 5 to 25 parts by weight based on the total solid content of the coating composition. When this amount is less than 5 parts by weight, the resultant film has inferior flexibility, and the viscosity of the resultant coating composition is too high to use it easily. When the amount is more than 25 parts by weight, the resultant film has inferior water resistance.

The coating composition of this invention may be used as such by optionally incorporating 0.1 to 2 parts by weight, based on 100 parts by weight of the resin solid content, of an amine-blocked acid catalyst as a curing auxiliary. Examples of such an acid catalyst are p-toluene sulfonate, dodecylbenzene sulfonate, dinonylnaphthalene disulfonate, etc.

Further, a water-soluble resin and a water-dispersible resin which are conventionally used as a resin in an aqueous coating composition may be incorporated. Examples of such a resin are a water-soluble polyester resin, maleinated fatty acid, water-soluble or water-dispersible epoxy resin, and the like. A leveling agent, antifoamer, and lubricant may be also incorporated. Further, a pigment may be kneaded with the above aqueous acrylic resin solution from which the organic solvent has been removed, and then, the resultant paste is formed into a coating composition in the same way as above.

The aqueous coating composition of this invention can be applied by a known method such as roll coat, spray or brushing. Substrates on which the aqueous coating composition can be applied are metal substrates such as a steel sheet electroplated with tin, tin-free steel sheet, aluminum sheet, and the like.

Further, the coating composition of this invention can be cured by baking it under various conditions from a baking condition at a temperature between 150° C. and 200° C. for 10 minutes to a high-temperature and short-period baking condition at a temperature of about 250° C. for about 10 seconds.

According to this invention, there is provided an aqueous coating composition which can give a film having excellent withstandability to retorting treatment and excellent processability.

This invention has a function and effect in that the film formed of the coating composition of this invention is imparted with a crosslinked structure and excellent withstandability to retorting treatment due to the existence of the N-alkoxymethyl-(meth)acrylamide in the aqueous acrylic resin, and that the film is imparted with suitable flexibility and excellent processability due to the combined use of the polyol with the amino resin.

Further, according to this invention, there is provided an aqueous coating composition having excellent shelf stability and excellent coatability even if its organic solvent content in the aqueous medium is smaller than 15% by weight.

Furthermore, according to this invention, there is provided an aqueous coating composition having excellent usefulness to coat outer surfaces of beverage cans and food cans.

According to this invention, there is provided an aqueous coating composition capable of forming a film which can withstand retorting treatment for drink and food sterilization and which has high hardness to reduce occurrence of damage to cans during transportation and excellent processability to adapt itself to the manufacture of cans in various forms.

EXAMPLES

This invention will be explained hereinbelow by reference to Examples, in which "part" stands for part by weight and "%" for % by weight.

PREPARATION EXAMPLE 1

Preparation of aqueous acrylic resin solution A1

A four-necked flask having a thermometer, a stirrer, reflux condenser, a dropping vessel and a nitrogen gas-introducing tube was charged with 100 parts of n-butanol. The temperature inside the flask was maintained at 105° C. while a nitrogen gas was introduced with stirring. At the same, a solution of 5 parts of benzoyl peroxide in 100 parts of a monomer mixture of 30% of styrene, 20% of ethyl acrylate, 10% of lauryl methacrylate, 20% of 2-hydroxyethyl acrylate, 10% of N-butoxymethylacrylamide and 10% of acrylic acid was added dropwise from the dropping vessel over 3 hours. Thereafter, the temperature was further maintained at 105° C. for 1 hour to react these components, and then 0.5 part of benzoyl peroxide was added to continue the reaction for 1 hour, And, the reaction was stopped. The n-butanol was distilled off under reduced pressure at 80° C. until the reaction mixture had a nonvolatile content of 83%, and then, 14.6 parts of diethanolamine and water were added to give a clear and viscous aqueous acrylic resin A1 having a solid content of 50% and a residual butanol content of 10%.

PREPARATION EXAMPLES 2-8

Preparation Example 1 was repeated by using the monomer composition shown in Table 1, whereby aqueous acrylic resin solutions A2 to A8 were obtained. In Table 1, the amount unit of each of the monomers is "% by weight", and the amount unit of each of the amine amounts is "part by weight" based on 100 parts of the total monomer mixture.

TABLE 1

| | Preparation Example | | | | | | | |
|---|---|---|---|---|---|---|---|---|
| | A-1 | A-2 | A-3 | A-4 | A-5 | A-6 | A-7 | A-8 |
| Styrene | 30 | | 30 | 30 | 50 | | 20 | |
| α-Methyl styrene | | 30 | | | | 56 | | 20 |
| Butyl acrylate | | 10 | | 10 | | | | |

TABLE 1-continued

| | Preparation Example | | | | | | | |
|---|---|---|---|---|---|---|---|---|
| | A-1 | A-2 | A-3 | A-4 | A-5 | A-6 | A-7 | A-8 |
| Ethyl acrylate | 20 | | 20 | | | | 10 | 20 |
| Lauryl methacrylate | 10 | | | | 10 | | 10 | |
| 2-Ethylhexyl acrylate | | 20 | 20 | 20 | | 22 | 10 | 30 |
| 2-Hydroxyethyl acrylate | 20 | | 10 | 15 | | | 45 | |
| 2-Hydroxypropyl acrylate | | 15 | | | | | | 15 |
| N-methoxymethylacrylamide | | 15 | 10 | 15 | | 12 | | |
| N-butoxymethylacrylamide | 10 | | | | 30 | | | |
| Acrylic acid | 10 | | 10 | | 10 | | | |
| Methacrylic acid | | 10 | | 10 | | 10 | 5 | 15 |
| Dimethylethanolamine | 15 | | | 12 | | | 5 | |
| Diethanolamine | | 10 | 12 | | 10 | 10 | | 15 |

PREPARATION EXAMPLE 9

Preparation of spiroguanamine resin solution B1

A four-necked flask having a thermometer, stirrer, reflux condenser and nitrogen gas-introducing tube was charged with 27.4 parts of spiroguanamine, 43.2 parts of a formaldehyde-containing isopropyl alcohol 40% solution (Formit IP, supplied by Koei Kagaku Co.) and 27.4 parts of isopropyl alcohol. The charged components were gradually heated at a reflux temperature with stirring for 30 minutes. 0.04 part of phthalic anhydride was charged, and the mixture was further heated for a reaction under reflux and dehydration over 8 hours until the temperature of the reaction mixture was 130° C. Then, the reaction mixture was cooled and filtered with a filter paper (retention particle diameter 5μ) to give a spiroguanamine resin, which was adjusted with butyl cellosolve to a solid content of 75%.

PREPARATION EXAMPLE 10

Preparation of spiroguanamine resin solution B2

The same flask as that used in Preparation Example 1 was charged with 40.5 parts of the same spiroguanamine and 59.5 parts of a formaldehyde-containing methanol 40% solution (Formit MH supplied by Koei Kagaku Co.), and the mixture was adjusted to pH 8.0 by using sodium methylate, and heated at 60° C. for 60 minutes. 0.02 parts of nitric acid was added, and the mixture was heated at 60° C. to react it for 10 hours. Then, sodium hydroxide was added in a neutralization amount, and a water phase was separated and removed. Thereafter, the methanol and water were removed under reduced pressure, and further, 25 parts of butyl cellosolve was added, and the mixture was filtered in the same way as in Preparation Example 9 to give a spiroguanamine resin, which was adjusted with butyl cellosolve to a solid content of 75%.

EXAMPLES 1-8

Table 2 shows a solid content ratio (percentage) of components for coating compositions prepared in these Examples. The components of each of these coating compositions were mixed according to Table 2, and then, the resultant mixtures were adjusted to an organic solvent content of 10% and a solid content of 35% by adding butyl cellosolve and water. And, 0.3% of p-toluene sulfonate and 0.3% of a silicone-based leveling agent were added to the mixtures to give aqueous coating compositions. Each of the aqueous coating compositions was coated on a TFS sheet (chromated steel sheet) by means of a natural roll coater, and the coatings were baked at 190° C. for 10 minutes to obtain coated sheets. The resultant films had a thickness of 6 to 8 μm.

COMPARATIVE EXAMPLE 1-4

Table 2 shows a solid content ratio (percentage) of components for coating compositions prepared in these Examples. The components of each of these coating compositions were mixed in amounts shown in Table 2, and the procedure of Comparative Example 1 was repeated to obtain coated sheets.

TABLE 2

| | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| A-1 | 60 | | 50 | | 40 | | | | | | | |
| A-2 | | 50 | | 50 | | | | | | | | |
| A-3 | | | | | | 45 | 40 | | | | | |
| A-4 | | | | | | | | 40 | | | | |
| A-5 | | | | | | | | | 50 | | | |
| A-6 | | | | | | | | | | 60 | | |
| A-7 | | | | | | | | | | | 40 | |
| A-8 | | | | | | | | | | | | 40 |
| Cymel 303 | 20 | 10 | 10 | 15 | 20 | 5 | 10 | 20 | 20 | 20 | 20 | 20 |
| Cymel 1123 | 5 | 5 | 15 | | 10 | | 10 | 10 | 10 | | 20 | |
| B-1 | 10 | | | 20 | 10 | | 20 | | | | | 20 |
| B-2 | | 20 | | | | 30 | | 10 | | | | |
| TONE 0301 | 5 | | 25 | | 20 | | | | | 20 | | 20 |
| BA10 Glycol | | 15 | | | | 20 | 20 | 20 | 20 | | 20 | |
| Flexorez UD320 | | | | 15 | | | | | | | | |

Notes:
1. The above amount unit is by percentage based on solid contents only.
2. Cymel 303: Hexamethoxymethylolmelamine (supplied by Mitsui-Cyanamid, Ltd.)
3. Cymel 1123: Benzoguanamine resin (supplied by Mitsui-Cyanamid, Ltd.)
4. TONE 0301: Polyester polyol (supplied by Union Carbide)
5. BA10 Glycol: Adduct of 10 moles of ethylene oxide with bisphenol A (supplied by Nippon Nyukazai)
Flexorez UD320: Polyurethane diol (supplied by King Ind.)

The coating compositions prepared in Examples and Comparative Examples were tested on their shelf stability and film properties. Table 3 shows the results.

The test methods are as follows.

Test on Coating Composition

Shelf Stability

A coating composition was stored at room temperature for 2 months, and then, its state (gelled, precipitated or separated) was observed.

Test on Film Properties

A coating composition was roll-coated on an electroplated tin sheet such that the resultant dried film had a thickness of 7 μm, and the coating was baked in a gas oven at an ambient temperature of 190° C. for 10 minutes to form a coated panel. Further, the coating composition was evaluated on its damage-free property as follows. Three-piece cans were made from a coated sheet in such a manner that the coated surface of the sheet formed the outer surfaces of the cans, and these cans were brought into contact with one another under vibration.

Water Resistance

A coated panel was heat-treated by immersing it in water at 100° C. for 30 minutes, and a whitened film state such as blister-like state was evaluated.

Processability

An Erichsen film test was carried out according to JIS Z-2247, i.e. by pressing a coated metal sheet until the metal sheet began to be broken, and the resultant film state was evaluated.

Impact Resistance

A coated sheet was tested by using a du Pont impact tester, in which an impactor having a diameter of ½ inch was brought into contact with the coated sheet surface, and a weight of 500 g was dropped. The impact resistance was evaluated by measuring a height at which no crack was caused on the film on the sheet.

Pencil Hardness

Film hardness was measured according to JIS K5400— "Pencil scratching test".

Adhesion

Film adhesion was evaluated by a cross-cut peeling test.

Damage-free Property

Cans were filled with certain contents, and then, the cans were brought into contact in hot water having a temperature of 80° C. The degree of the resultant damage on the can surface was evaluated.

Flow

Immediately after a coating composition was coated by means of a roll coater, the coating was baked, and then its leveling state was evaluated.

12,000, which is produced by copolymerizing monomers (i) to (v):
- (i) 25 to 35% by weight of at least one aromatic vinyl monomer,
- (ii) 25 to 45% by weight of at least one alkyl (meth)acrylate having an alkyl group containing 1 to 18 carbon atoms,
- (iii) 1 to 15% by weight of at least one α,β-monoethylenically unsaturated carboxylic acid,
- (iv) 5 to 25% by weight of at least one hydroxyalkyl (meth)acrylate having a primary hydroxyl group, and
- (v) 1 to 25% by weight of at least one N-alkoxymethyl (meth)acrylamide having an alkyl group containing 1 to 4 carbon atoms,
- (b) 20 to 50 parts by weight of a spiroguanamine resin formed by converting spiroguanamine represented by the following formula

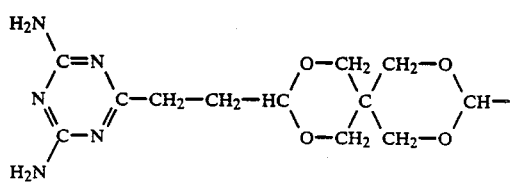

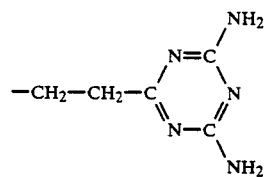

or a mixture of said spiroguanamine with melamine or benzoguanamine to a methylol form, and partially alkyletherifying the methylol-formed guanamine with an alcohol having 1 to 3 carbon atoms, and
- (c) 5 to 25 parts by weight of a polyol containing a terminal hydroxyl group and having a weight aver-

TABLE 3

|  | Example | | | | | | | | Comparative Example | | | |
|---|---|---|---|---|---|---|---|---|---|---|---|---|
|  | 1 | 2 | 3 | 4 | 5 | 6 | 7 | 8 | 1 | 2 | 3 | 4 |
| SHELF STABILITY | Ex.*¹ | Ex. | Ex. | Ex. | Ex. | Ex. | Ex. | Ex. | Poor (precipitated) | Good | Good | Good |
| FILM PROPERTIES | | | | | | | | | | | | |
| Water resistance | OK | OK | OK | OK | OK | OK | OK | OK | OK | OK | OK | Blisters |
| Retorting treatment withstandability | OK | OK | OK | OK | OK | OK | OK | OK | Whitened | Dissolved | Whitened | Dissolved |
| Processability | ○ | ○ | ◎ | ○ | ◎ | ◎ | ○ | ○ | ○ | △ | ○ | △ |
| Impact resistance | ○ | ○ | ○ | ○ | ○ | ◎ | ○ | ○ | ○ | ○ | × | ○ |
| Pencil hardness | 4H | 4H | 3H | 4H | 3H | 4H | 4H | 4H | 4H | 2H | 4H | 2H |
| Adhesion | NP*² | NP | NP | NP | NP | NP | NP | NP | NP*² | 100%*³ | 50%*⁴ | Good |
| Damage-freeness | OK | OK | OK | OK | OK | OK | OK | OK | OK | Damage | OK | Damage |
| Flow | Ex. | Ex. | Ex. | Ex. | Ex. | Ex. | Ex. | Ex. | Inferior | Good | Good | Good |

Notes:
*¹Ex. means excellent.
*²NP means no peel occurrence.
*³100% stands for 100% peel occurrence.
*⁴50% stands for 50% peel occurrence.

What is claimed is:
1. An aqueous coating composition which comprises:
(a) 30 to 65 parts by weight of an aqueous acrylic resin being soluble or dispersible in an aqueous medium containing 2 to 25% by weight of an organic solvent in the presence of a base and having a weight average molecular weight of 3,000 to age molecular weight of up to 1,000, wherein the polyol is at least one member selected from the group consisting of a polyalkylene-terminated diol, polyester diol, polyester polyol, acrylic polyol, polybutadiene-terminated diol, polyurethane polyol, adduct of bisphenol A with ethylene oxide, adduct of bisphenol A with propylene oxide, adduct of bisphenol F with ethylene oxide and adduct of bisphenol F with propylene oxide, provided that the total amount of the above (a), (b) and (c) is 100 parts by weight.

2. A coating composition according to claim 1, which further comprises a vinyl carboxylate and/or a vinyl alkyl ether in such an amount that the total amount of the aromatic vinyl monomer, the alkyl (meth)acrylate and vinyl carboxylate and/or vinyl alkyl ether is 50 to 80% by weight based on the aqueous acrylic resin.

3. A coating composition according to claim 2, wherein the vinyl carboxylate is at least one member selected from the group consisting of vinyl acetate and vinyl propionate.

4. A coating composition according to claim 2, wherein the vinyl alkyl ether is at least one member selected from the group consisting of vinyl ethyl ether, vinyl propyl ether and vinyl butyl ether.

5. A coating composition according to claim 1, wherein the aromatic vinyl monomer is at least one member selected from the group consisting of styrene and α-methylstyrene.

6. A coating composition according to claim 1, wherein the alkyl (meth)acrylate having an alkyl group containing 1 to 18 carbon atoms is at least one member selected from the group consisting of methyl (meth)acrylate, ethyl (meth)acrylate, butyl (meth)acrylate, 2-ethylhexyl (meth)acrylate, cyclohexyl (meth)acrylate, stearyl (meth)acrylate, lauryl (meth)acrylate, decyl (meth)acrylate and dodecyl (meth)acrylate.

7. A coating composition according to claim 1, wherein the α,β-monoethylenically unsaturated carboxylic acid is at least one member selected from the group consisting of acrylic acid, methacrylic acid, crotonic acid, maleic acid, fumaric acid and itaconic acid.

8. A coating composition according to claim 1, wherein the hydroxyalkyl (meth)acrylate having a primary hydroxyl group is at least one member selected from the group consisting of hydroxymethyl (meth)acrylate, hydroxyethyl (meth)acrylate, hydroxypropyl (meth)acrylate, hydroxybutyl (meth)acrylate and hydroxyamyl (meth)acrylate.

9. A coating composition according to claim 1, wherein the N-alkoxymethyl(meth)acrylamide having an alkyl group containing 1 to 4 carbon atoms is at least one member selected from the group consisting of N-methoxymethyl(meth)acrylamide, N-(n-butoxy)methyl(meth)acrylamide and N-(isopropyl)methyl(meth)acrylamide.

10. A coating composition according to claim 1, wherein the base is a volatile base having a boiling point of not more than 400° C.

11. A coating composition according to claim 10, wherein the volatile base is ammonia or an organic amine.

12. A coating composition according to claim 1, wherein the aqueous medium contains 2 to 25% by weight of a water-soluble organic solvent.

13. A coating composition according to claim 1, wherein the aqueous medium contains 5 to 15% by weight of a water-soluble organic solvent.

14. A coating composition according to claim 12, wherein the water-soluble organic solvent has a boiling point of 40° to 150° C.

15. A coating composition according to claim 13, wherein the water-soluble organic solvent has a boiling point of 40° to 150° C.

* * * * *